Feb. 12, 1946.    G. A. TINNERMAN    2,394,728
FASTENING DEVICE
Original Filed June 26, 1942
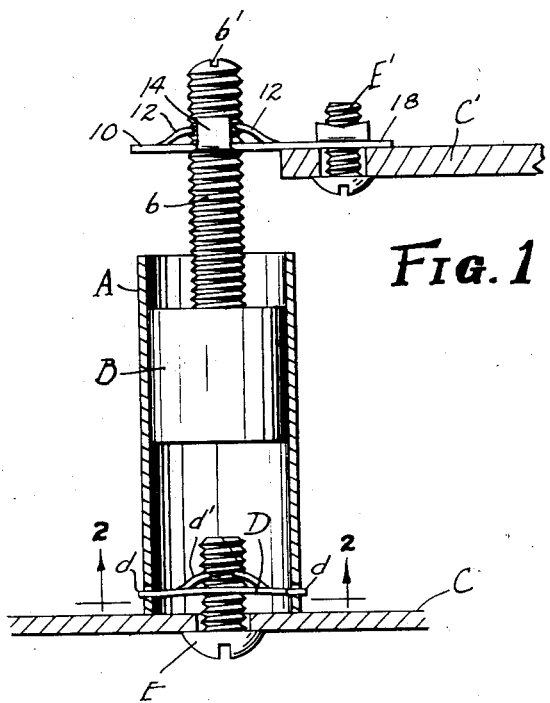
FIG. 1
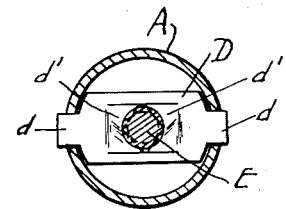
FIG. 2
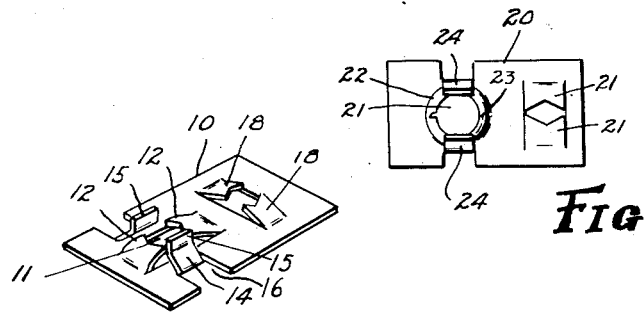
FIG. 4
FIG. 3
INVENTOR.
GEORGE A. TINNERMAN
BY Bates, Teare & McBean
ATTORNEYS Patented Feb. 12, 1946

2,394,728

UNITED STATES PATENT OFFICE 2,394,728

FASTENING DEVICE

George A. Tinnerman, Cleveland, Ohio, assignor to Tinnerman Products, Inc., Cleveland, Ohio, a corporation of Ohio Original application June 26, 1942, Serial No. 448,592. Divided and this application February 17, 1944, Serial No. 522,755

2 Claims. (Cl. 85—36)

This application is a division of my copending application 448,592, filed June 26, 1942, which latter application is a continuation in part of application 340,203, filed June 12, 1940, now Patent No. 2,326,903, issued August 17, 1943.

This invention relates to a fastening device for screw threaded shafts for use where it is desired to effect a helical engagement in a thread groove as a nut and also to maintain frictional engagement with the crests of the thread. The invention is especially useful in connection with various instruments having screw-threaded adjustments, for instance, tuning or similar devices in radio apparatus. Such instruments frequently include a coil form or the like and an adjusting screw providing for axial adjustment of the tuning core within the coil form.

My invention provides in a very simple manner for maintaining a frictional engagement with the crests of the threaded adjusting screw, preventing its jarring loose, where the screw carries an electric current, my frictional clamp is of further advantage in preventing leakage or irregularities from movement of the screw in the nut. My invention is particularly useful in radio apparatus mounted on automobiles or other locations where it is subjected to constant vibration, tending to disturb the adjustment and interfere with the reception.

To the above ends, I have provided a simple device which furnishes at once a nut by means of warped edges engaging in the groove of the thread and spring tongues projecting from the same device, but positioned so as not to interfere with the nut members, extending parallel with the axis of the screw and engaging crests of its threads to maintain a friction tight engagement therewith.

In the drawing, Fig. 1 is a sectional elevation of an instrument mounting embodying my invention; Fig. 2 is a sectional plan thereof in a plane indicated by the line 2—2 on Fig. 1; Fig. 3 is a perspective of the fastener of Fig. 1, looking at the top thereof; Fig. 4 is a plan of a modified form of fastener.

Referring first to the embodiment shown, A in Fig. 1 illustrates an instrument in the form of a cylinder housing a tuning core B which has an axially extending threaded operating shaft $b$. The cylinder A is held on a suitable support C in any suitable manner.

I have shown the instrument anchored to the support by means of a bridge piece D having reduced ends $d$ occupying openings in the cylinder and having a screw-receiving central opening with oblique tongues $d'$ on the opposite sides thereof. These tongues are cut from the body of the strip and bent upwardly and notched and warped at their edges, so as to be able to engage a screw thread, and act as a nut therefor. Such a screw is indicated at E in Fig. 1 and by screwing upwardly through the support C into the bridge piece, it locks the cylinder to the support in a very simple manner.

The screw shaft $b$ of Fig. 1 is shown as having a screw driver slot $b'$ in its upper end. Accordingly, by providing a supporting nut for it the core B may be readily moved axially in the cylinder. However, support by an ordinary nut is not satisfactory, where an accurate adjustment should be maintained, especially if the instrument is liable to receive vibration. My device, about to be described, and as hereinbefore outlined, not only provides the nut but also frictional engagement for maintaining a tight connection.

In the drawing, 10 indicates my combined nut and frictional engager. This nut has a bolt receiving opening 11 about which the fastener is formed in a helical manner to engage the thread of the bolt. In the embodiment of Figs. 1 and 3, the fastener has a pair of opposed tongues 12 cut from the body and bent upwardly in an inclined direction with U-shaped warped ends to engage in the helical thread of the bolt.

The fastener being described has a pair of upstanding tongues rising from the two regions at the opposite sides of the tongues 12. These upstanding tongues are made by partial severance from the body of the fastener, leaving external notches 16, and are then bent inwardly at 14 in a diagonal direction and finally upwardly at 15 to provide two nearly parallel opposed end portions engaging under spring pressure opposed portions of the crest of the thread of the screw $b$ in diametrically opposite regions, while the tongues 12 seat in the threads of such bolt in diametrically opposite regions at right angles to the friction engaging tongues 14.

The plate 10 is formed into a nut to engage an attaching screw E' which may secure the fastener to a supporting plate C'. The nut formation for this purpose preferably comprises two opposed tongues 18 provided by a pair of parallel slits and an opening between them, the tongues being bent up and their edges notched and warped to bound a helical turn.

The fastener 20 of Fig. 4 is very similar to the fastener of Figs. 1 to 3. It has the same arrangement of tongues 21, like the tongues 18, whereby it may be secured by a screw to a support. It has also the same arrangement of friction engaging tongues 24 to lie against the crests of the threaded bolt. The thread engaging portion in this embodiment differs from that of Figs. 1 to 3 in that in Fig. 4 I have provided a nearly annular wall 22 about the bolt opening 21, this wall at its edge being flanged inwardly in a helical form, as indicated at 23, to engage in the thread groove of a bolt the crests of which are engaged by the tongues 24.

It will be seen that each of the two embodiments of the invention illustrated have the common feature of a passageway for a threaded bolt and two sets of engaging devices coacting with such bolt, one set occupying the thread groove of the bolt to act as a nut and the other set engaging crests of the bolt thread to frictionally hold the bolt against displacement in the nut. Likewise, each of these embodiments may be made from a single strip of spring sheet metal simply by cutting and bending operations.

I claim:

1. A fastener comprising a plate of sheet metal having an opening through it, the metal of the plate being raised and warped on diametrically opposite sides of the opening to seat in the thread of a bolt passing through the opening, a pair of notches in opposite external margins of the plate on diametrically opposite sides of said opening, the direction of the two diameters referred to being transverse to each other, tongues formed by said notches bent at an angle to the plate to have a spring engagement with crests of the thread of the same bolt.

2. A fastener comprising a plate of resilient sheet material having an opening through it, the material of the plate about the opening being deformed upwardly to seat in the thread of a bolt passing through the opening, a pair of notches in opposite external margins of the plate aligned with said opening, tongues formed by said notches bent upwardly toward each other at an oblique angle to the plate and then continuing upwardly in substantially parallel relation to have a spring engagement with crests of the thread of the same bolt.

GEORGE A. TINNERMAN.